(12) United States Patent
Hudson et al.

(10) Patent No.: US 7,387,249 B2
(45) Date of Patent: Jun. 17, 2008

(54) PRODUCT VERIFICATION AND AUTHENTICATION SYSTEM AND METHOD

(75) Inventors: Philip Hudson, Hants (GB); John Drinkwater, Hants (GB)

(73) Assignee: Optaglio Limited, Swindon (GB)

( * ) Notice: Subject to any disclaimer, the term of this patent is extended or adjusted under 35 U.S.C. 154(b) by 0 days.

(21) Appl. No.: 10/297,701

(22) PCT Filed: Jun. 5, 2001

(86) PCT No.: PCT/GB01/02480

§ 371 (c)(1),
(2), (4) Date: Dec. 5, 2002

(87) PCT Pub. No.: WO01/95249

PCT Pub. Date: Dec. 13, 2001

(65) Prior Publication Data

US 2003/0141358 A1    Jul. 31, 2003

(30) Foreign Application Priority Data

Jun. 5, 2000  (GB) ................... 0013662.2
Jun. 20, 2000  (GB) ................... 0015091.2
Aug. 4, 2000  (GB) ................... 0019258.3

(51) Int. Cl.
*G06K 7/10* (2006.01)

(52) U.S. Cl. .................. 235/462.01; 235/462.09; 235/462.34; 235/384

(58) Field of Classification Search ............. 235/375, 235/380, 382.5, 384, 385, 462.01, 462.08, 235/462.09, 462.24
See application file for complete search history.

(56) References Cited

U.S. PATENT DOCUMENTS 4,184,701 A * 1/1980 Franklin et al. ............. 283/67
4,206,965 A   6/1980 McGrew
4,544,266 A   10/1985 Antes (Continued)

FOREIGN PATENT DOCUMENTS

DE   38 40 037 A1   5/1990

(Continued)

OTHER PUBLICATIONS

Burckhardt, C.B., "Display of Holograms in White Light", The Bell System Technical Journal, Dec. 1966, pp. 1841-1844.

(Continued)

*Primary Examiner*—Ahshik Kim
(74) *Attorney, Agent, or Firm*—Townsend and Townsend and Crew LLP

(57) ABSTRACT

The present invention provides for a system and method for product verification for use with products intended to be introduced into circulation and including machine readable product data, and comprising a product data storage means, at least one portable reading device for said machine readable product data, wherein the machine readable product data is applied to products and is arranged for inspection by the at least one portable reading device remotely from the product data storage means and at at least one point in the product circulation route, and wherein the at least one portable reading device is arranged to verify the authenticity of the machine readable product data and thereby verify the authenticity of the product itself.

55 Claims, 6 Drawing Sheets

U.S. PATENT DOCUMENTS

| | | |
|---|---|---|
| 4,568,141 A | 2/1986 | Antes |
| 4,576,439 A | 3/1986 | Gale et al. |
| 4,629,282 A | 12/1986 | McGrew |
| 5,101,184 A | 3/1992 | Antes |
| 5,138,471 A | 8/1992 | McGrew |
| 5,306,899 A * | 4/1994 | Marom et al. ............... 235/382 |
| 5,331,443 A | 7/1994 | Stanisci |
| 5,367,148 A * | 11/1994 | Storch et al. ............... 235/375 |
| 5,461,239 A | 10/1995 | Atherton |
| 5,483,363 A | 1/1996 | Holmes et al. |
| 5,513,019 A | 4/1996 | Cueli |
| 5,582,434 A | 12/1996 | Skov et al. |
| 5,658,411 A | 8/1997 | Faykish |
| 5,659,408 A | 8/1997 | Wenyon |
| 5,694,229 A | 12/1997 | Drinkwater et al. |
| 5,815,292 A | 9/1998 | Walters |
| 5,825,475 A | 10/1998 | Formosa |
| 5,856,070 A | 1/1999 | Korth |
| 6,036,807 A | 3/2000 | Brongers |
| 6,062,604 A | 5/2000 | Hardwick et al. |
| 6,088,161 A | 7/2000 | Lee |
| 6,104,812 A * | 8/2000 | Koltai et al. ................. 380/51 |
| 6,157,474 A | 12/2000 | Orr et al. |
| 6,246,778 B1 * | 6/2001 | Moore ........................ 382/103 |
| 6,278,538 B1 * | 8/2001 | Schleipen ................... 359/201 |
| 6,360,208 B1 * | 3/2002 | Ohanian et al. ............... 705/31 |

FOREIGN PATENT DOCUMENTS

| | | |
|---|---|---|
| DE | 196 12 819 A1 | 10/1997 |
| EP | 0 651 365 A1 | 5/1995 |
| EP | 0 919 961 A2 | 6/1999 |
| GB | 2 149 532 A | 6/1985 |
| GB | 2 243 139 A | 10/1991 |
| WO | WO 93 18419 A1 | 9/1993 |
| WO | WO 94 24615 A1 | 10/1994 |
| WO | WO 95 02200 A1 | 1/1995 |
| WO | WO 95 34008 A1 | 12/1995 |
| WO | WO 98 08691 A1 | 3/1998 |
| WO | WO 99 36271 A1 | 7/1999 |
| WO | WO 99 59036 A1 | 11/1999 |

OTHER PUBLICATIONS

Hariharan, P., "Colour Holography", *E. Wolf, Progress in Optics Volume XX*, p. 265-324, North-Holland, 1983, Oxford, Amsterdam New York, US.

Tedesco, James M., "Holographic Diffusers for LCD Cockpit Displays", Proceedings of the SPIE, SPIE, 1994, vol. 2219, pp. 327-337, Bellingham, VA, US.

* cited by examiner

PRODUCT VERIFICATION AND AUTHENTICATION SYSTEM AND METHOD

BACKGROUND OF THE INVENTION

1. Field of the Invention

This invention relates to a new tax revenue protection and product authentication system designed to protect government agencies or brand owners from losses of tax revenues (particularly excise tax in case of governments) from the effects of product counterfeit, illegal import of excise-liable goods and cross border trading and also to protect the consumer from the dangers of consumption of counterfeit products (particularly, counterfeit drinks, tobacco, foods, pharmaceuticals, automotive spare parts) or alternatively designed to protect integrators of complex technical devices such as aircraft parts, computers and electronic devices. This system may also have military security applications for audits of inventory, etc.

2. Description of the Related Art

This invention concerns the production, use, tracking and verification through-out the circulation chain of producer/importer, distributor, retailer of a secure data label or other instrument on a product carrying both machine readable data regarding the product and preferably secure visual means to check for product authenticity using a visual optical security element such as a diffractive optical device or a thin film interference optical device. This label is coupled to a product tracking and tracing system for the government agency or commercial entity employing random data/product inspections throughout the circulation chain as a way of using inspection feedback to monitor the system.

The problem of loss of government revenue due to product counterfeit, illegal (gray) import and cross-border trading has reached a monumental scale. Billions of dollars are lost each year due to the sale of illegal goods, especially excise-liable goods. Excise evasion leads to evasion from income tax and other taxes because in some territories sales of illegal goods are unrecorded and contribute to the black market economy. Governments have long attempted to prevent this introducing various methods to ensure the legality of the goods. The most wide spread of these methods is the introduction of counterfeit-proof excise stamps (usually sequentially numbered) applied to every unit of product. This method, however, only partially solves the problem because, firstly, excise stamps themselves contain only physical security features without any data verification elements and are therefore liable to counterfeit. Practice shows that most of the time creating a consumer-passable counterfeit is enough to ensure safe sale of illegal or counterfeit product. Such counterfeit is unlikely to pass a lab test but such tests are rare and usually performed only when a major source of counterfeit goods is discovered by law enforcement agencies. Secondly, excise stamps are supplied to producers and importers in a random manner, hardly any database exists that would record the limited (albeit valuable) information that a traditional excise stamp has to offer i.e. sequential numbers and there is no information-based system that would describe both the producers and importers of the product and the product itself and allow to verify the legality of the product by tracing and verifying its route to the point of origin.

Currently various approaches have been used for product security. These include security labelling using anti-counterfeit features such as holograms, diffractive devices, threads or various forms of security print to add an authentication label or document to the good containing a difficult to counterfeit public recognition security device. Examples of such optical diffractive features are known in the art and by usage and specific examples amongst several can also be found in U.S. Pat. Nos. 4,561,41, 5,034,003, WO-A-93/18419, U.S. Pat. Nos. 5694229 and 5,483,363. Such labels can also contain a unique number usually added via overprint. However, these systems suffer disadvantages. First, they provide no tracing of the product through the distribution or retail system to protect the supplier against parallel trading. Secondly, they provide the consumer with no additional security other than their recognition of a public recognition security device and, thirdly, the security of this device against counterfeit or passing off can vary depending on the quality and technology of the device. Also there is no means for measuring or monitoring the system other than by active inspection.

A further system, as used in the drinks industry, comprises adding to the valuable items a security label containing both a visual security element for consumer recognition and verification in the form of a diffractive optical device, and also a bar-code pattern containing descriptive data for use by, for example the product issuing authority and the selling authority to reconcile and control the sale of product. This system represents an improvement over previous systems because it allows the government agency or the manufacturer to monitor and verify the sales that are made. However, the verification available to the issuing and inspection authorities or the consumer, e.g. end customer, is disadvantageously limited to the visual recognition of the optical diffractive security device.

Similarly attempts have been made by integrators of complex mechanical and electronic devices to ensure traceability of parts and components supplied to them. However, available means of authentication used have often failed to ensure the authenticity of such parts and components.

BRIEF SUMMARY OF THE INVENTION

The present invention seeks to provide for a product authentication system and method having an advantage over known systems and methods.

According to one aspect of the current invention there is a provided product verification system for use with products arranged to pass along a distribution route, consisting of for example a commercial consumer distribution route or business-to-business circulation, and including machine readable product data, and comprising product data storage means for storing data corresponding to the machine readable product data applied to the products, and at least one, preferably intelligent, e.g. programmable, portable reading, (and preferably processing and storing) device arranged for accessing the machine readable product data at a point along the distribution route and preferably programmed with an algorithm allowing the verification of the authenticity of such product data and storage of the results of the verification process and preferably arranged to download the results of the generally multiple verification processes into the product data storage means and generating report files. In a preferred embodiment the verification process is carried out randomly on a portion of the products and can be in on embodiment carried out according to a predetermined or automatically generated (e.g. sequence of random checks) inspection protocol and the results of the inspection are stored and communicated to the authorities for verification and enforcement.

In an alternative embodiment of the current invention, there is provided a product verification system for use with products arranged to pass along a commercial consumer distribution route or business to business circulation and including machine readable product data, and comprising data storage means for storing data corresponding to the machine readable product data applied to the products, and at least one portable reading device arranged for accessing the machine readable product data at a point along the distribution route and to verify the authenticity of such product data via establishing a connection with product data storage means and comparing product data applied to the products with corresponding product data sourced from such product data storage means.

In a preferred embodiment of the current invention there is provided label means upon which machine readable product data is provided. The label means can be applied to each product unit and/or the packaging of each product unit. Alternatively the label means can be applied to the packaging of batches of product units. Advantageously the label means can comprise a security label which is arranged to be destroyed when tampered with or when the product is unwrapped. The security label does not have to be totally destroyed when tampered with but rather can be arranged to reveal that tampering has taken place.

The machine readable product data can be applied to at least one of individual product units, the label means, the packaging of individual product units or the packaging of batches of products using any one of, or any combination of, thermal transfer, inkjetting, digital printing processes, mechanical engraving, laser engraving and traditional printing techniques. It is to be understood, however, that this list is not exhaustive and that the current invention is not to be limited to these techniques of applying machine readable product data to the product, label means or packaging.

In another embodiment a visual security device is incorporated into the system. The visual security device can comprise, but is not limited to, at least one of a diffractive optical device, a holographic device, a thin film interference device, a security print, water marked paper, threaded paper, windowed threaded paper, or security print paper. In a further embodiment the optical security device includes hidden security features. The hidden security features can comprise, but is not limited to, at least one of fluorescent images, diffractive images, microtexts or microimages. In one preferential embodiment the print element of the label will contain at least one feature 'digitally watermarked' (as detailed below by repetitively altering the edge pixel pattern) preferentially designed such that the feature is destroyed by scanning or copying. In a preferred embodiment the visual security device is a diffractive or holographic device consisting of a surface relief diffractive structure.

In one embodiment the visual security device is incorporated into a label means containing machine readable product data. The label means may then be applied to individual product units, the packaging of individual product units or the packaging of batches of product units. In an alternative embodiment the visual security device is applied to each product unit by embossing or engraving.

Advantageously in one embodiment the visual security device is arranged to be machine readable. Several forms of machine readability are possible. One method would be to use an array of point diffraction gratings each diffracting in a different direction matched to a reader consisting of a diode laser or similar illumination device and several discrete detectors or a CCD detector for detecting the array of output spots which can then be decoded.

Another preferred form of machine readable device incorporated within a hologram is to incorporate a small diffractive version of a bar code, preferentially a 2D bidirectional bar code (e.g. PDF-417 format) into a portion of the holographic or diffractive image. This would provide a forensically authenticatable machine readable feature. In a preferred embodiment a small are of a security diffractive or holographic image scale size 1×1 mm up to 5×5 mm would contain a microscopically reduced version of a 2D PDF bar code recorded as either a set of diffractive or white diffusive areas mixed with non recorded areas to provide the black and white coding. Each pixel would be significantly smaller than those normally read by PDF bar codes and would typically be of a size less than the normal resolution of the human eye i.e. typically less than 250 micron, typical pixel size around 25 to 100 micron. The bar code accuracy would rely on the high resolution of holographic and diffractive recording processes—a preferential recording process would be the direct writing of the pattern by electron beam lithography as known in the art. A preferential form of the pixels would be as matt white scattering structures of random microscopic form, although diffractive and diffraction grating structures could also be used. The machine readable structure could also be concealed within another visual part of-the image. Typically the structure of the machine readable pattern would not be visible by eye but could be used to verify the authenticity of a diffractive security device by a forensic verification process comprising recording an enlarged view of the machine verifiable feature using an optical microscope and printing out an enlarged version of the PDF bar code on a digital or photographic printer or similar, then reading the recorded enlarged bar code on a conventional 2D bar code reader to check that the bar code is both readable and contains the correct data. Optionally a special bar code scanner could be used that reconstructed an enlarged image of the diffractive 2D bar code on an image sensitive device as used in a typical scanner to decode the bar code. The forensic route using optical microscopy offers a useful opportunity to edge enhance by image processing the image captured to increase the accuracy of bar code decoding. Usefully this covert bar code would contain special information about the system or the security diffractive device, optionally encrypted to make back engineering very difficult and optionally linked to the encrypted features in the bar codes recorded on the items.

Preferably the machine readable product data is in the format of a barcode. Further, the bar-code format can be a bi-dimensional format. In another embodiment the machine readable product data is encrypted. Advantageously asymmetric or dynamic key encryption algorithms can be used to encrypt the machine readable product data.

In yet another embodiment the system comprises a product identification reference. The product identification reference can be arranged to identify corresponding product data stored in the product data storage means.

In yet another embodiment the machine readable product data is 'digitally watermarked'—a particularly useful way to achieve this involves slightly and characteristically altering certain parts of the 2D bar code such that the code remains readable but also contains certain second order information. Generally the second order information would be contained in the edge of each bar code pixel which would contain instead of a sharp edge one or two small grey scale pixels on one or both edges whose repetitive nature or other coding formed a hidden code or characteristic of that particular code (a 'digital watermark'). A particularly preferred position to locate such pixels would be in the border or start/stop bars incorporated at each edge of the code where the additional second order marking is less likely to degrade the reading of the code information. This marking would serve as a way of securing the source of each bar code. For example, each application or group of applications could have a different digital watermark or each printer or group of printers for an application could be so encoded. A useful way to write such a bar code would be using a so called digital print engine, which could reproduce each bar code using a different digital watermark. Preferentially a digital printer would work from a custom symbol library for any particular bar code for any particular application—so for example there could exist a library of custom 2D bar code symbols each corresponding to a slightly different edge pattern on the pixels or guard bars which could be used for any particular application or particular encoding required. Another preferential route for production would be to alter the print driver of a thermal print engine when used for security applications such that each 2D code contained a particular additional encoding over-laying the main encoding. A useful way to detect such encoding would be to scan the bar code into a commercially available software, programme, such as Adobe Photoshop, and use some custom code written with this programme to decode the particular hidden code within the bar code. A preferential and more straightforward way to decode such 'digital watermarks' in bar codes would be to compare the scanned bar code against an ideal black and white pure edge bar code which would rapidly by difference reveal any edge encoding on edge pixels of the image. This could be done relatively straightforwardly with some custom software which after comparison then detects the repetitive pattern in the edge pixels and then detects the repetitive code (e.g. binary pattern) stored therein. The additional coding would not only protect against counterfeit to allow an additional level of verification but would preferably also be constructed in such a way that the additional code was degraded beyond recognition by copying or scanning to evidence counterfeit or attempted counterfeit by copying or scanning. This would then provide additional evidence of counterfeit and protection against the same. An example of one way of forming such a code is shown in FIG. 5. Optionally some of the fixed printed information in a document would also contain such additional protection which would optionally be linked into the digital watermark applied to the 2d bar code. This technique could also be used as a way of digitally watermarking line graphic print as used for security print by adding additional information to the edges of the line or block areas.

In a further embodiment the comparison between the machine readable product data and the product data stored in the product data storage means is performed automatically. Access to the product data stored in the product data storage means can be arranged to be secure to prevent unauthorised access. Additionally, the machine readable product data can also be compared with the product itself to identify any discrepancies between the actual physical product and the description in the machine readable product data. In a preferred embodiment these checks are random and are performed on a portion of the products. In a preferred embodiment the verification process is carried out randomly on a portion of the products and can be in one embodiment carried out according to a predetermined or automatically generated (e.g. sequence of random checks) inspection protocol and the results of the inspection are stored and communicated to the authorities for verification and enforcement. This is advantageous to ensure complete independence of the system against internal corruption within the portions of the authenticating body.

The product verification system can also be arranged to be integrated into a warehousing system.

According to a second aspect of the current invention there is provided a method of verifying products with machine readable product data arranged to pass along a distribution route and comprising the steps of inputting the product data into a product data storage system; applying the machine readable product data to each product unit; reading the machine readable product data with a portable reading device at least one point in the product distribution route; verifying the authenticity of such product data using a pre-programmed intelligent reading, processing and storing device or using a simpler reading device to communicate with the product data storage means in order to compare the received product data from the product with product data of the product data storage system for verification purposes; and downloading the results of the verification.

Preferably the method of verifying products includes the additional step of applying a visual security device to the product. Preferably the visual security device is a diffractive or holographic device, preferably a surface relief structure with tamper evident properties.

The method of verifying products can include the additional step of inspecting the visual security device applied to the product. In one preferred embodiment the verification actions occur for a portion of the products selected randomly.

Alternatively the method of verifying products includes the additional step of inspecting the visual security device with a reading device.

Advantageously the method of verifying products includes the additional step of including hidden security features in the visual security device.

The method of verifying products can include the additional step of inspecting the hidden security features in the visual security device.

Preferably the method of verifying products includes the additional step of comparing the product itself with the machine readable product data. Preferably this step is carried out by the inspecting authority randomly according to a pre-determined or randomly determined inspection routine.

Favourably the method of verifying products includes the additional step of comparing machine readable product data and/or product data stored in the product data storage means and/or the product itself with other documentation.

According to another aspect of the current invention there is a product data storage system arranged to store data corresponding to machine readable data elements associated with products, and arranged to be accessed by at least one reading device for the retrieval of product data stored in the storage system and to allow for modification of the product data by the at least one reading device.

This invention concerns the production, use, tracking and verification through-out the distributor, retail and consumer chain of a secure data label or other instrument on a product carrying both machine readable data regarding the product and preferably secure visual means to check for product authenticity using a visual optical security element such as a diffractive optical device or a thin film interference optical device. This label is coupled to a product tracking and tracing system for the enforcement or issuing agency and where certain aspects of which can be accessed by the inspection entities during random inspections via a link or when inspection protocols are generated according to a predetermined or random system where the database is accessed and part of the information down-loaded to a (preferentially hand held) inspection device used during an inspection, where the inspected product data is compared against the genuine product data obtained from the database to detect any discrepancies and the genuine and comparison data is then communicated back to the database or the product issuing or enforcement agency or both to generate a result of the inspection procedure. The results of the inspection procedure and comparisons can also be generated real time during the inspection process itself. This provides a way of using occasional inspection feedback to monitor and enforce the correct operation of the system.

This invention also relates to a product anti-counterfeiting and authentication system and related method.

The problem of counterfeit of high value goods or health or safety critical goods is becoming an increasing menace due to the proliferation of manufacturing technologies which enables fake goods or print to be readily counterfeit to a standard of finish and packaging that can readily deceive consumers. Examples of product items at risk include high value consumer goods such as fashion goods and watches, beverages, health critical pharmaceuticals, safety critical items such as spare parts for aircraft or vehicles, computer software and certain government or official documents. Brand owners, for example producers of high-value branded consumer products or producers of safety or health critical products, can suffer from product counterfeit, illegal importation and cross-border trading resulting in reduced revenue streams for such brand owners, damage to brand reputation and potentially substantial legal liabilities for damage caused by faulty goods.

Consumers also suffer from the unknowing purchase of sub-standard counterfeit products both for personal reasons in paying for a sub-standard non-genuine product with reduced quality and benefits and also in some cases for personal health and safety reasons such as in the purchase and use of counterfeit medicines, pharmaceuticals, or counterfeit spare parts. Such aforementioned consumers also include end users or installers who wish to verify the authenticity of their products such as doctors and hospitals for pharmaceuticals, aircraft maintenance companies and airlines for aircraft spare parts, motor commercial vehicle spare parts, computer spare parts and generally any item of value with a critical or important function where it is useful to guarantee or verify the authenticity and standards of performance. Also, the term product is intended to cover all possible items/activities of commerce and including services and know-how.

The present invention seeks to provide for a product authentication system and method having an advantage over known systems and methods.

According to one aspect of this invention a product authentication system for use with products including secure machine readable product data preferably in some cases provided in the form of a label carrying the machine readable data and an optical diffraction based visual security device for securitisation and visual authentication, and comprising a product data storage means, a plurality of reading devices for reading said secure machine readable product data, communication link means between said reading devices and said product data storage means, wherein the reading devices are adapted to read the machine readable product data on products remotely from the product data storage system and communicate said product data to said product data storage system via the communication link means to facilitate comparison of the product data on the product with product data in the product data storage system and to enable modification of the data in the product data storage system for each unit or batch of product, and including means for accessing the modified data so as to identify the manner in which the data was modified by input from the reading devices and so identify the passage of a unit of product via a succession of reading devices.

In preferred embodiments the reading devices would be used through the product distribution chain for tracking and authenticating the product up to the point of sale by a retailer to an end customer or supply to an end commercial customer. In preferred embodiments the end customer would be able to access the database, possibly to limited controlled extent possibly by use of an internet web site, to verify the authenticity and product distribution route data of their particular product. This would provide not only visual authentication and verification of genuineness for the end customer by, in a preferred embodiment, visual verification of the authenticity of a diffractive optical security device on the label but also on-line verification for the end customer via the database access of product authenticity. In preferred embodiments the end user would characterise the product for the database using a number generated at the point of sale on for example a purchase receipt or advantageously by use of a visual number incorporated on the product label. This would thus provide total visual authentication and traceability authentication for a product not just down the supplier distribution chain but also additionally for the end consumer or user.

In a preferred embodiment the means for labelling the products with secure machine readable product data generates a label which is attached to the product which in a preferred embodiment also carries a visual diffractive optical security device for public recognition with a function to provide security for the machine readable data against unauthorised copying and also to secure the product against illegal copying. The label is attached to each product unit, preferably with a suitable adhesive, and/or can be attached to the packaging of each product unit or a batch of products. In a preferred but not limiting embodiment the label is arranged to be tamper proof such that when the label is interfered with it is obvious upon visual inspection that an attempt has been made to remove the label. In one such embodiment the label is arranged to be irreparable upon tampering to prevent alteration and reuse.

In a preferred embodiment visual security devices are incorporated into the product authentication system preferably incorporated in the label and preferably in the form of diffractive or holographic security devices designed to provide a visual image by the process of diffraction for visual public recognition purposes. This is to provide a visual public recognition authentication and security device in addition to the machine readable verifiable device to provide a secure visual method of authentication to all parties along the distribution chain including the customer to prevent illegal copying of the labels. At least one visual security device is attached to each product unit or the packaging for each product unit, and in the preferred embodiment the diffractive visual security device is integrated into the same label as the machine readable data to secure the data and provide a public recognition security device to verify its authenticity to prevent illegal copying and illegal duplication of coded data. An alternative form of optical security device could include an optical security device based on thin film optical effects. The visual security devices can also be applied to the packaging of a batch of products. The visual security devices may be preferably a visual security device based on the process of optical diffraction such as a diffraction grating based device (e.g. 'kinegram', 'exelgram') as known in the art or a security hologram, as known in the art)

which is a particularly advantageous class of device for high security and a high degree of public recognition. Other known print security devices may be integrated with this primary device or alternatively, although not preferentially used to provide the first line of visual security. These anticipated secondary devices include the security print based techniques of watermarked paper, threaded paper, windowed threaded paper or security print paper. It is to be understood however that this is a non-exhaustive list and that the current invention is not restricted to these types of security devices.

In the preferred embodiment of this invention the visual diffractive security device is incorporated into the label generated by the means for labelling products with machine readable product data in order to secure the machine readable data against unauthorised copying and reproduction, to provide both a visual security device and a machine readable potentially uniquely encoded security device within the same label, such that the visual security device protects both the product and the machine readable data from unauthorised duplication and passing off.

A security data carrier label is normally applied onto every unit of product. The product data can be unique or batch numbered or coded as appropriate. The security data carrier includes a diffraction anti-counterfeit element comprising a surface grating or holographic grating generating an optical diffraction effect (hologram) and/or other physical security elements such as security print, watermarked paper, threaded paper, window thread paper, security print paper.

In another advantageous and preferred embodiment of this invention a visual human readable product identification number can be included in the product data applied to each product unit. This number can later be used by the end consumer when, for example, accessing the product database over an Internet connection to obtain tracing data for the product. Alternatively in a simpler form of the invention the tracing number could be generated and issued to the end customer at the point of sale for use in interrogating the product database to ascertain authenticity.

Preferably the identification number, or at least part of this, is applied to the label carrying the machine readable data and advantageously is applied to this indelibly and preferentially is applied indelibly to the optical diffraction visual security element in order to protect the product identification number from alteration. An advantageous method of achieving this would be by a variable chemical demetallisation process or by, for example, a laser ablation based demetallisation process. This number could also be applied to the product itself and could also be applied to the product indelibly.

By these means in a preferred embodiment of this invention a single tracking label applied to an article provides a secure diffraction based visual security device for product and label authentication and protection against counterfeit, a machine readable portion preferably a bar code (possibly 1-D or of the 2-D high density format such as PDF-417) carrying product authentication and tracking data potentially unique or batched, for example, and in one alternative embodiment a visual number for use by the end user when accessing the database to ascertain the product history and authenticity.

In one possible alternative embodiment the diffractive device could also contain highly secure machine readable diffractive data matched to specialised readers for use by some or all read stations suitably equipped. This would be for additional secure data storage and verification, or possibly to allow access to additional secure fields of data within the machine readable portion of the code to add additional security and functionality.

Particularly useful applications of a whole product secure authentication and tracking system containing both visual security elements, tamper proof qualities and secure machine readable elements where the system is designed to allow the end user to verify the product would be in the protection of high value luxury goods or spirits against counterfeit or diversion, the protection of high value or health and safety critical goods such as pharmaceuticals or critical computer or mechanical parts (e.g. aeronautics) against counterfeit and diversion.

Other embodiments of the product identification system utilise different means for encoding preferably labels and optionally products with machine readable product identification data. One such approach is to use a thermal transfer device. Alternative approaches to encoding products with machine readable product identification data include inkjet printers, laser printers, digital printing systems, etching systems, embossing systems or engraving systems. It is to be understood that these techniques are indicated only as examples and that the current invention is not limited to these particular techniques.

Preferably the communication link facilitates electronic data transactions. The communication link can be physical such as the hardwired telephone network, and can include internet connections, or can be wireless incorporating transceiver means.

In a further embodiment the interface to the computerised product data storage system incorporates security means. In one instance the security means comprises encryption algorithms. The interface, for example a web site for access by a standard web browser, is used by customers who have purchased a product with product source data to access the computerised product data storage system to verify the product distribution route data contained within the computerised product data storage system for the purposes of authenticating the purchased product. Alternatively the interface could consist of a dedicated system. The security means ensures that only authorised persons, such as the customer, can gain access to the data stored in the computerised product data storage system. Access can also be restricted to data pertaining to the specific purchased product or some other subset of the data stored in the computerised product data storage system. A restriction to read only can also be placed on the interface.

Advantageously in one embodiment the machine readable product identification data applied to the product is in the format of a bar-code. In another embodiment it is in the format of a bi-dimensional bar-code. The machine readable product identification data can also be encrypted. In one instance dynamic key encryption algorithms are used to convert product identification data into bar-code format.

In another embodiment machine readable product identification data is incorporated into the visual security devices.

According to another aspect of the invention a method of product authentication for products with machine readable product data comprising the steps of inputting the product identification data into a product data storage system; reading the product identification data of the product with a reading device at least one inspection point within the product distribution chain; communicating the product identification data read by the reading device to the product data storage system via a communication link; comparing the received product identification data from the reading device with the product data stored in the product data storage system for authentication purposes and modifying the product distribution route data in the product data storage system, and allowing for access to the modified data so as to confirm the manner in which the data was modified at the said at least one inspection point.

Preferably, the method includes the step of labelling products with visual security devices.

The method can include the step of authenticating the product at the visual inspection point(s) by the visual security devices.

The method can include the step of accessing the computer product data storage system via an interface to verify data.

The method can also allow for verification of, for example, a code or number carried on security label or generated at last point of reading by machine reading device, for example at point of purchase.

According to another aspect of the invention there is provided a product data storage system arranged to store data corresponding to secure machine readable data elements associated with products, and arranged to allow for serial modification of the said data by means of interaction with respective series of reading devices, and arranged to allow for later, preferably limited, access to the modified data by an end customer or consumer so as to confirm the manner in which the original data was modified interaction with each of the said reading devices so as to allow the end customer to confirm the genuineness of the product. Said confirmation step is preferably carried out independently of any reading device by the end customer or consumer accessing the database by, for example, a web site and inputting a number or code or other data associated with the product or its point of purchase, such code to be optionally generated at point of purchase or preferably to refer to be visual readable code or number also carried by the secure product label that visual number optionally carried in a secure indelible way.

This invention concerns the production, use, tracking and verification throughout the distributor, retail and consumer chain of a secure data label or other instrument on a product carrying both machine readable data regarding the product and preferably secure visual means to check for product authenticity using a visual optical security element preferably such as a diffractive optical device or a thin film interference optical device. This label is coupled to a product tracking and tracing system for the manufacturer or brand owner and where certain aspects of which can be accessed by the end consumer via an internet site as a check for authenticity for the consumer and as a way of using consumer feedback to monitor the system.

BRIEF DESCRIPTION OF THE SEVERAL VIEWS OF THE DRAWINGS

In order that the invention may be clearly understood and readily carried into effect some preferred embodiments thereof will now be described, by way of example only, with reference to the accompanying drawings, in which.

DETAILED DESCRIPTION OF THE INVENTION

Figure 1:
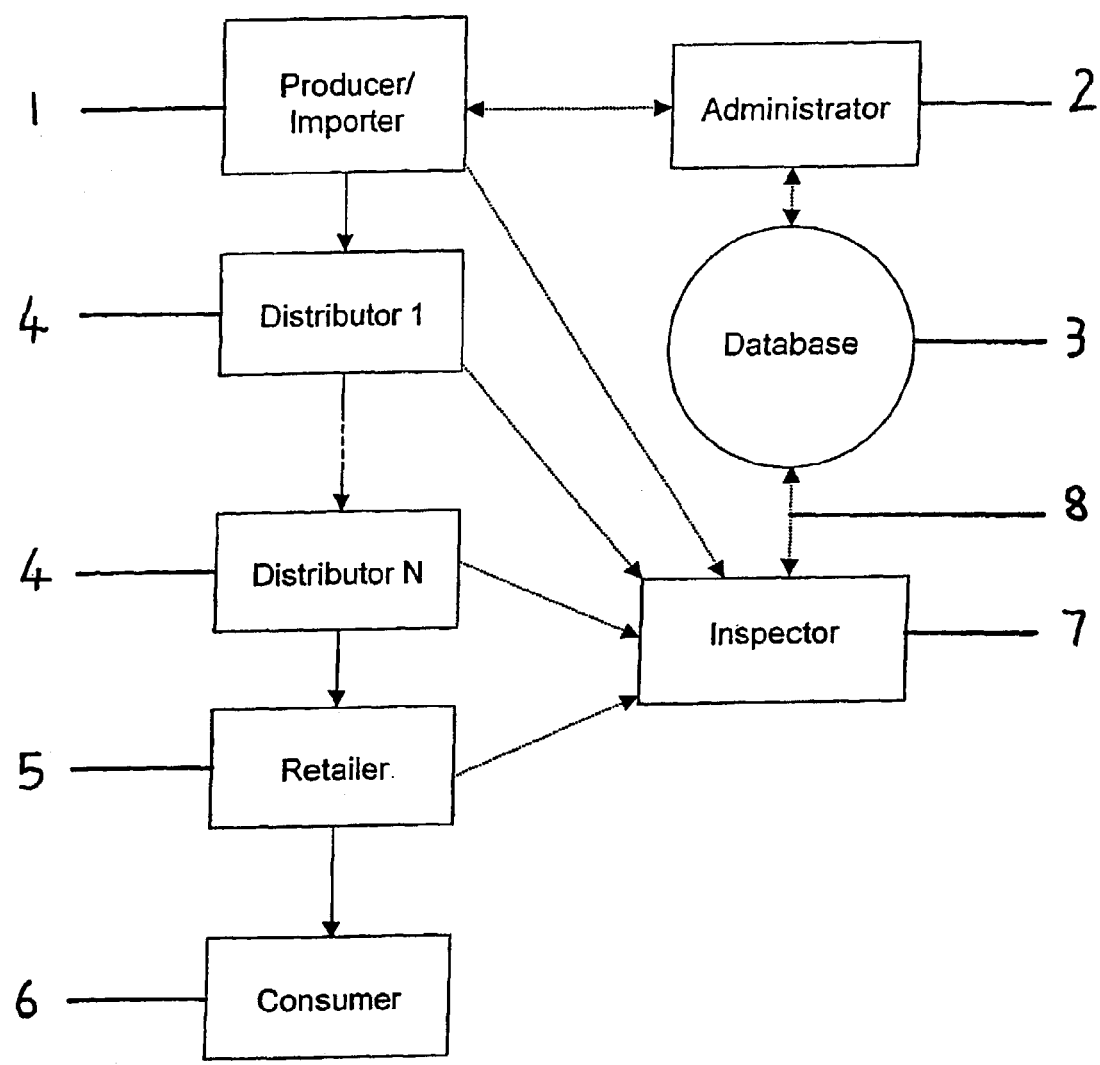
FIG. 1—is block diagram representing a product verification system according to one embodiment of the current invention.

In FIG. 1 there is illustrated the source of, for example a branded product and identified as the producer 1 importer 1, an administrator 2, a database 3, a plurality of potential inspection points 4 in a distribution route identified as distributors (1 . . . n), a point of sale 5, a customer 6, an inspector 7 equipped with a portable reading device (not shown) and a generally temporary communication link 8 between the portable reading device and the database 3 through which the result of the inspection conducted by the portable reading device on a portion of the products in circulation preferably according to a predetermined or random protocol generated by the system or inspection agency can be downloaded or data can be down loaded from the database before inspection.

The producer/importer 1 is the business entity responsible for introduction of a product into circulation or the distribution route. The administrator 2 is an entity authorised by a regulator to operate and maintain the system, or can be the regulator itself, wherein the regulator is a government executive body such as the tax inspectorate or security responsible body or an integrator of complex mechanical or electronic devices. The database 3 is a data storage system arranged to receive, store and possibly update product data and is administered by the administrator 2. Distributors are participants in the commercial circulation of a product and the route of the product from the producer/importer 1 through all of the distributors that handle the product to the point of sale 5 to the customer 6, defines the distribution route. The inspector 7 is the agent acting on behalf of the regulator who inspects the products at at least one inspection point 4 anywhere in the distribution route. The inspection may take place at the premises of a particular distributor or the producer/importer 1 of a product, or during transit between distributors or holding facilities, or at the point of sale 5 to the customer 6.

Figure 2:
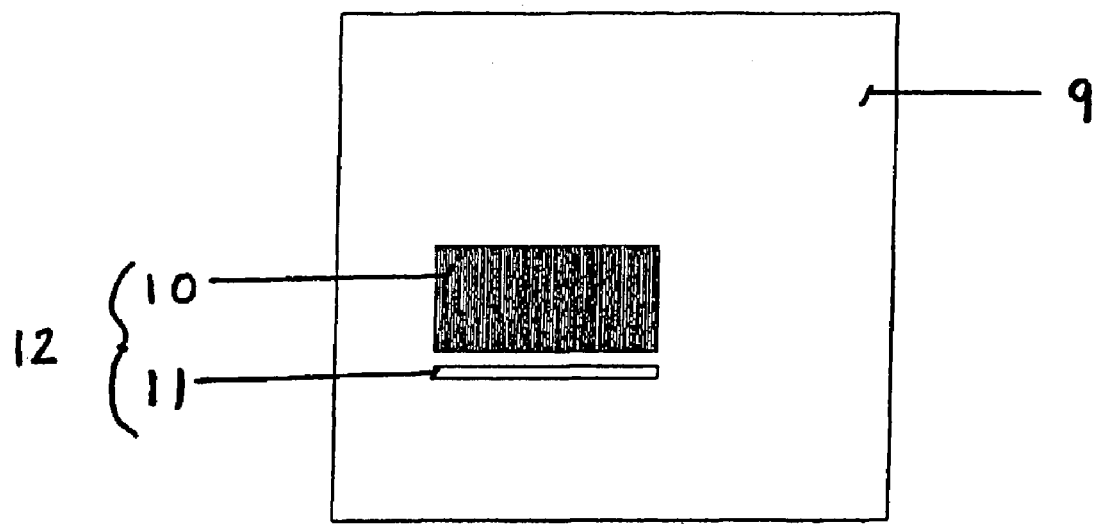
FIG. 2—illustrates product data applied to a product/product packaging according to one embodiment of the current invention.

FIG. 2 illustrates a product 9 with product data 12 comprising a machine readable component 10 and a reference code 11.

In the embodiment illustrated in FIG. 2 the product data 12 are applied directly onto individual product units 9 and/or the packaging of individual product units 9 and/or the packaging of batches of the product 9. The machine readable product data 10 is in the form of a bar-code and the reference code 11 is in the form of an alphanumeric code. The product data recorded in the bar-code 10 can relate specifically to the goods on which it is applied so, for example, the volume of spirits contained in bottles may be recorded, or the type of spirit. The product data recorded in the machine readable product data 10 can also include the alphanumeric code. The product data can also contain an additional digital watermark, as described above, to additionally verify the product data and its origin.

Figure 3:
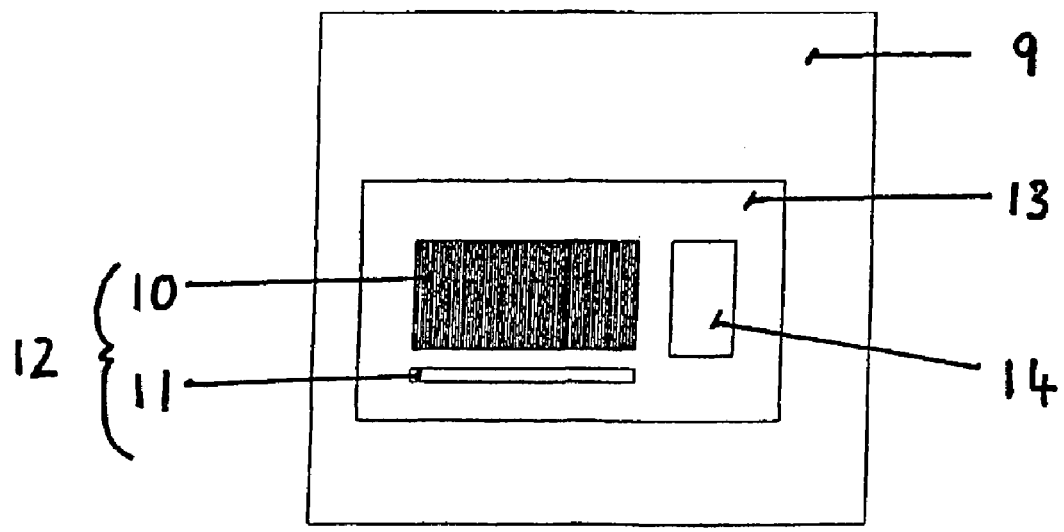
FIG. 3—illustrates product data and a visual security device applied to a product/product packaging by means of a security label according to one embodiment of the current invention.

FIG. 3 illustrates a product 9 with product data 12 comprising a machine readable component 10 and a reference code 11, wherein the product data 12 are applied to a label 13. The label can be attached to individual product units 9 and/or the packaging of individual product units 9 and/or the packaging of batches of the product 9. Also applied to label 13 is an optical security device 14. The machine readable product data 10 is in the form of a bar-code and the reference code 11 is in the form of an alphanumeric code.

The operation of one embodiment of the invention will now be described. A producer/importer 1 applies to an administrator 2 for issue of labels 13 for the number of units of a product 9 that he intends to be introduced into a particular territory. The labels 13 are generated by the administrator 2 and contain product data 12 comprising a bar-code 10 and an alphanumeric reference code 11. Corresponding product data to that applied to the labels 13 is stored in a database 3. The labels 13 are supplied to the producer/importer 1 who attaches them to each unit of a product 9. The product 9 is then released into commercial circulation, eventually reaching a customer 6 via the distribution route. In case of integrator for complex mechanical or electronic devices acting as regulator, such regulator also acts as the customer 6.

At at least one inspection point 4 in the distribution route, which is preferably selected at random, an inspector 7 inspects at least one product unit 9 and its corresponding product data 12. The inspection can take place anywhere in the distribution route from the place of manufacture/import into the territory, any intermediate holding or storage facility, the premises of any distributor, when in transit in the territory or at the point of sale 5 to the customer 6. The inspector 7 may make a plurality of inspections at different inspection points 4, on a portion of the products in the distribution route or revisit the site 4 of an earlier inspection to carry out further checks.

The inspector 7 is equipped with a portable reading device (not shown) which is arranged to read the machine readable product data 10 which, in this embodiment, is in the form of a bar-code.

In one embodiment of the current invention the intelligent reading device is pre-programmed to verify the authenticity of the product data without communication to the database 3. In this case the product data is converted into the bar-code 10 in such a way that its retrieval is only possible by using such preprogrammed intelligent reading device. The inspector 7 may be prompted by the reading device to input the alphanumeric reference code 11 in ordere to verify it against the reference list of alphanumeric codes contained in the memory of the reading device. If such verification is successful, the reading device enables bar code reading mode. The inspector 7 uses the portable reading device to read the bar code 10. Correct reading of the bar code is fully dependent on conversion algorithm and the reading will fail if the label 13 is counterfeit and the conversion algorithm used to print the bar code is incorrect. If the reading is successful, the data stored in the bar code 10 is displayed to the inspector 7 who can compare the data visually with the product 9 to see if, for example, the spirit bottlres are 0.5 cl and contain whiskey. The inspector 7 can also check the product data against other commercial documentation. Yet another check is the comparison of the alphanumeric code 11 against the alphanumeric codee in the machine readable product data 10.

In an alternative embodiment of the current invention the portable reading device can also temporarily communicably connected to the database 3 via communication link means 8, for example a cellular telecommunication link or hardwire link. The inspector 7 uses the portable reading device to read the barcode 10. The inspector 7 can use the alphanumeric reference code 11 to retrieve product data stored in the database 3 corresponding to the machine readable product data 10 on the label 13, via communication link means 8. A comparison can be made between the product data stored in the database 3 visually with the product 9. A further comparison can be made between the product data stored in the database 3 and the machine readable product data 10. This further comparison can be made with at lease a portion of the data in the database 3 having been uploaded to the portable device for comparison purposes. The inspector 7 can also check the product data against other commercial documentation. Yet another check is the comparison of the alphanumeric code 11 against the alphanumeric code in the machine readable product data 10. Yet another check would be to check digital watermark data in the bar codes and to check machine readable data within the visual device as a second line of forensic features to check genuiness of product data in more detail.

The inspector 7 can use the portable reading device to update the database 3 with the inspection results or other data.

As mentioned the machine readable product data 10 can be in the form of a bar-code. The bar-code can be in the format of a linear bar-code or in the format of more sophisticated devices such as the PDF-417 bi-dimensional barcode. The machine readable product data 10 can also be in an encrypted format. One such technique is to encrypt the data using asymmetric or dynamic key encryption algorithms. This prevents unauthorised retrieval of data from the barcode with non-specialised commercial bar-code scanners and prevents creation of counterfeit bar codes which can easily be detected because they use a different conversion algorithm. Another technique is to encode digital watermark data into small elements of the bar code for forensic use as described above or to check the machine readable data stored within the diffractive structure.

The machine readable product data 10 can be applied to a label 13 which in turn is applied to the product 9 or its packaging. In this embodiment the machine readable product data 10 can be applied to the label 13 using any one of, or any combination of, thermal transfer, inkjetting, digital printing processes, mechanical engraving, laser engraving and traditional printing techniques. The label 13 can be applied to products automatically, by machines for example, or manually. Alternatively the machine readable product data 10 can be applied directly to the product 9. In this embodiment the machine readable product data 10 can be applied to the product 9 by a variety of techniques such as embossing, mechanical engraving, laser engraving, printing.

The label 13 can be arranged to be destroyed if tampered with or if an attempt is made to remove it from a product 9 or when the product 9 is unwrapped. The label 13 does not have to be totally destroyed but rather can be arranged to indicate that tampering has taken place.

In another embodiment an optical security device 14 (see FIG. 3) can be applied to the label 13 or the product 9 directly. This provides a means of visual verification and helps to prevent illegal copying. The optical security device 14 can comprise any one of, or any combination of, a diffractive optical device, a holographic device, a kinegram, a thin film interference device, security print workings potentially including digital watermarks, water marked paper, threaded paper, windowed threaded paper, or security print paper. This is an nonexhaustive list of the type optical security devices 14 that can be used. The preferred visual security devices anticipated are diffractive as these have a high degree of public recognition value and a high degree of counterfeit resistance.

The optical security device 10 can be arranged to be verified using instruments means (not shown) and/or visually. Instrument verification comprises the assessment of the presence and quality of hidden optical security features such as UV fluorescent images, hidden diffractive images, microtexts and micro-images using such instruments as UV lamps, laser detectors, magnifying glasses. Visual verification comprises visual assessment of the presence and quality of features such as depth, colour shifts and kinetic effects. The optical security device 14 can also be arranged to store machine readable product data 10 in a suitable format.

The inclusion of optical security devices 10 provides a further form of inspection for the inspector 7 to conduct. During an inspection the inspector 7 can visually verify the optical security device 14 and/or verify the optical security device instrumentally.

The product data stored in the database 3 may be encrypted and access to the database 3 can be made secure, for example, by using passwords and security protocols such as SSL.

Reading device (not shown) can be arranged to automatically compare the machine readable product data 10 with the product data retrieved from the database 3 to verify the product 9 at the inspection point 4.

Applications can be made to the administrator 2 either in documentary format, on-line via the internet, for example, or on-line using secure connections.

Additionally, the system can be integrated in the Producer's/Importer's 1 warehousing system enabling search and movement control functions for the product 9 at such a warehouse. Communication is possible between the respective warehousing database and the database 3. Such a warehousing system is likely to use radio-frequency devices.

The communication link means 8 can include a modem in conjunction with commercial mobile telecommunications equipment, a custom dedicated mobile telecommunications system, the hardwired (or optical fibre) telephone network, the internet, or other available means.

Retrieval of machine readable product data 10 from the label 13 using a reading device is an important procedure. Failure to retrieve machine readable product data 10 in valid form can be an indication of possible counterfeit.

Cross-checking of machine readable product data 10 against commercial documents relates to verification of machine readable product data 10 data elements describing the producer/importer 1 i.e. the origin of the product 9 against invoices, bills of lading, certificates and other commercial documents at the inspection point 4 which documents refer of a certain product route supposed to be originating at the same point of origin. For example, if an invoice, bill of lading or certificate shows that the product 9 was supplied by X originated at Y, and the machine readable product data 10 shows Z as the producer/importer 1, this may be an indication of illegal commercial transactions.

Updating and cross-checking the database 3 can be performed off-line after a series of inspections the result of which are stored in reading devices memory. This approach is facilitates verification of the inspection results against the product data stored in the database 3, and creation of a separate bank of data with inspection results for future reference. Alternatively, updating and cross-checking the database 3 can be performed on-line by way of establishing a connection, preferably a secure connection, between a reading device and the database 3 at the inspection point 4 via communication link means 8.

Generating the protocol of inspection is intended to exclude negligence or corruption of the Inspector by way of verifying the recorded results of inspections which revealed potentially illegal product 9 against actions taken and/or reported by the inspector 7 in every particular case.

Figure 4:
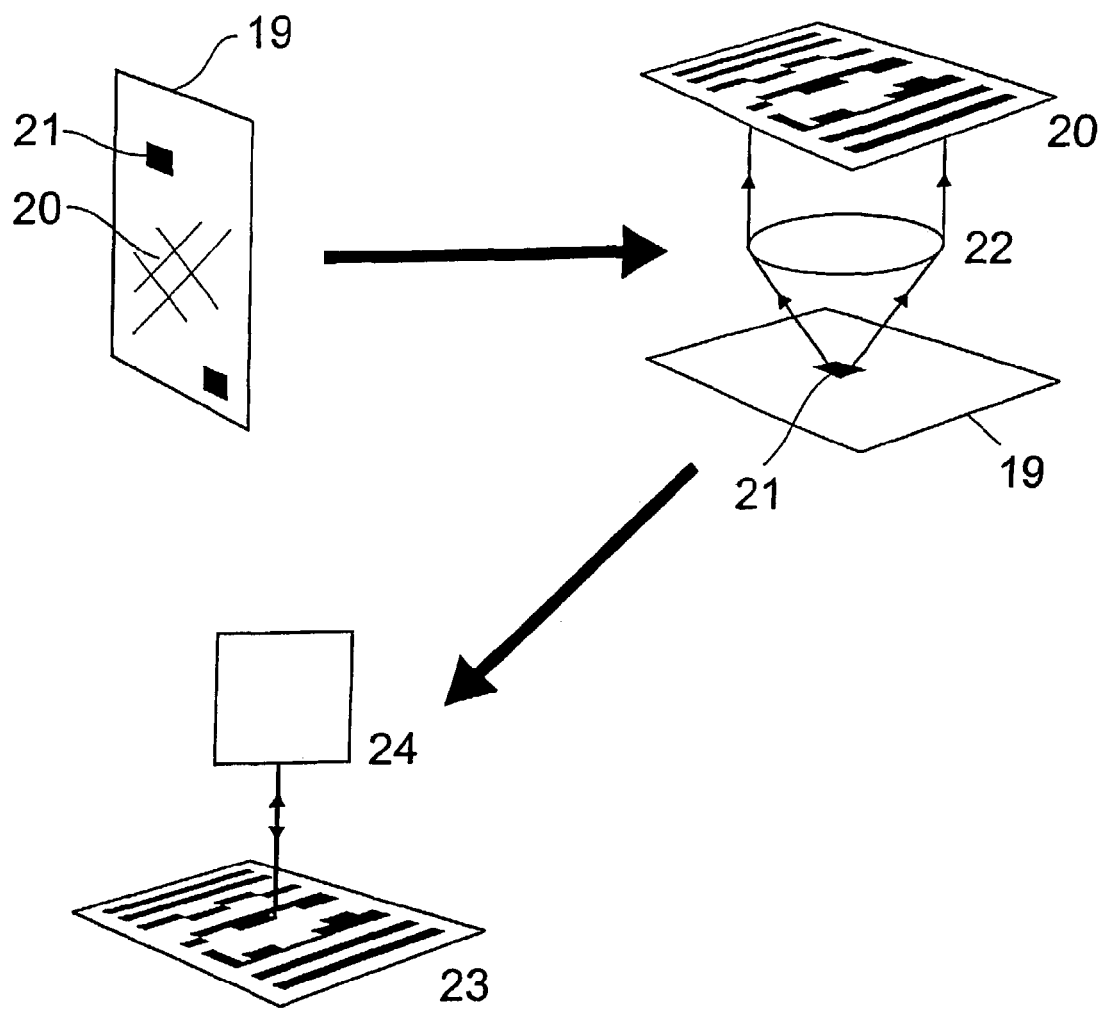
FIG. 4—illustrates the operation of a forensic machine readable diffractive device according to an embodiment of a particular apect of the present invention.

FIG. 4 illustrates the operation of a forensic machine readable diffractive device according to an embodiment of the invention and as discussed above. A security diffractive or holographic device (19) displays a diffractive image (20) for visual authentication and also contains a small area (scale size 1 mm) containing forensic feature consisting or small areas (beneath visual resolution) of diffractive or matt scattering structure which therefore undetectable by the eye. The whole device appears as a small square featureless or matt area. To authenticate the device, and enlarged picture (23) is obtained of the structure using for example an optical microscope (22), which can then be scanned by a 2D bar code reader (24) to authenticate the device. Optionally the 2D bar code in the forensic diffractive feature is encrypted.

Figure 5:
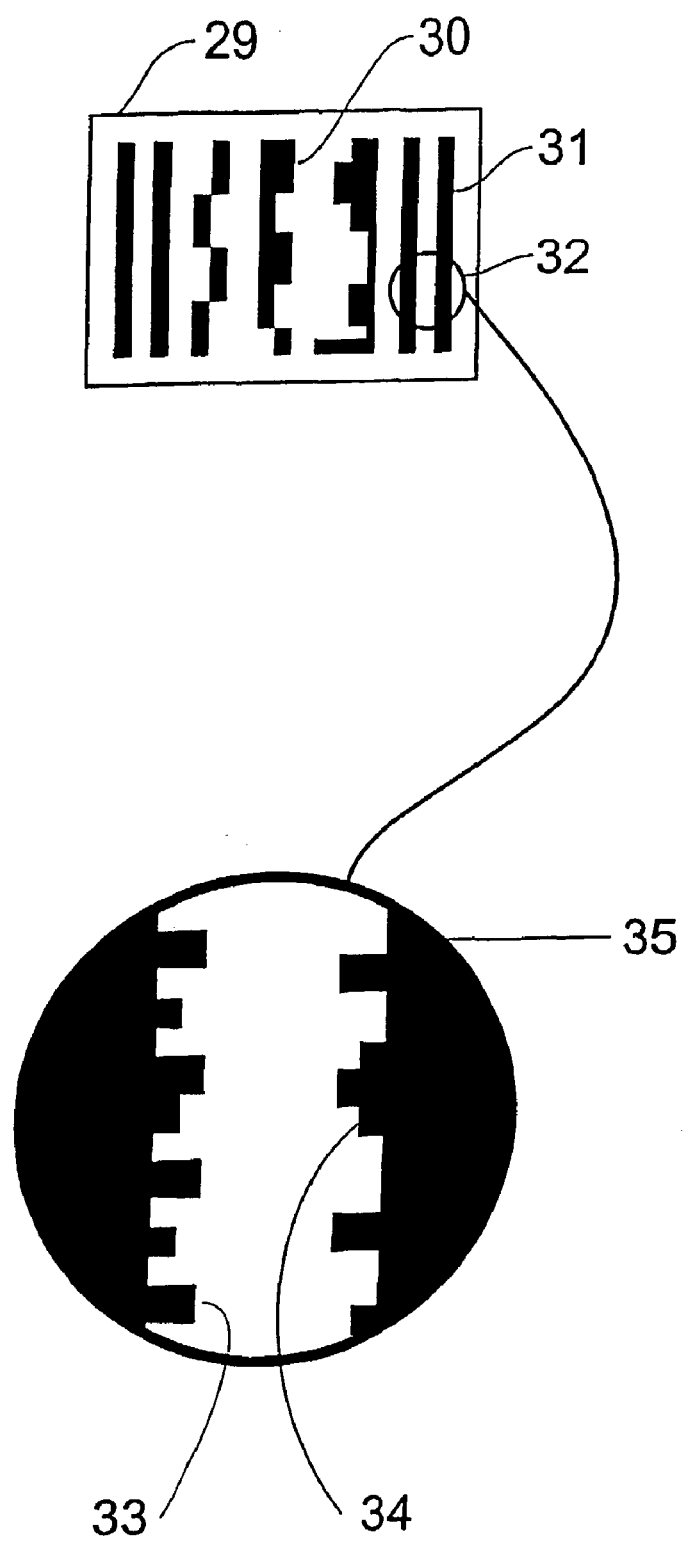
FIG. 5—illustrates a digital watermark according to an embodiment of another particular aspect of the invention.

FIG. 5 illustrates an area (29) containing machine readable data containing primary data in the form of a 1D or 2D bar code (30) containing a secondary code or digital watermark in the form of a very small repetitive binary or pixel pattern along the edge of the main data blocks (33,34) shown schematically and enlarged by around 100 times (35). A particularly useful area to incorporate these additional forensic codes is in the edge guard bars (31) and the enlargement (35) shows a portion of these guard bars showing a microscopic repetitive pixel pattern forming the digital watermark for the bar code (33,34) which can be revealed upon scanning and image processing the image using a standard package such as Adobe Photoshop.

Figure 6:
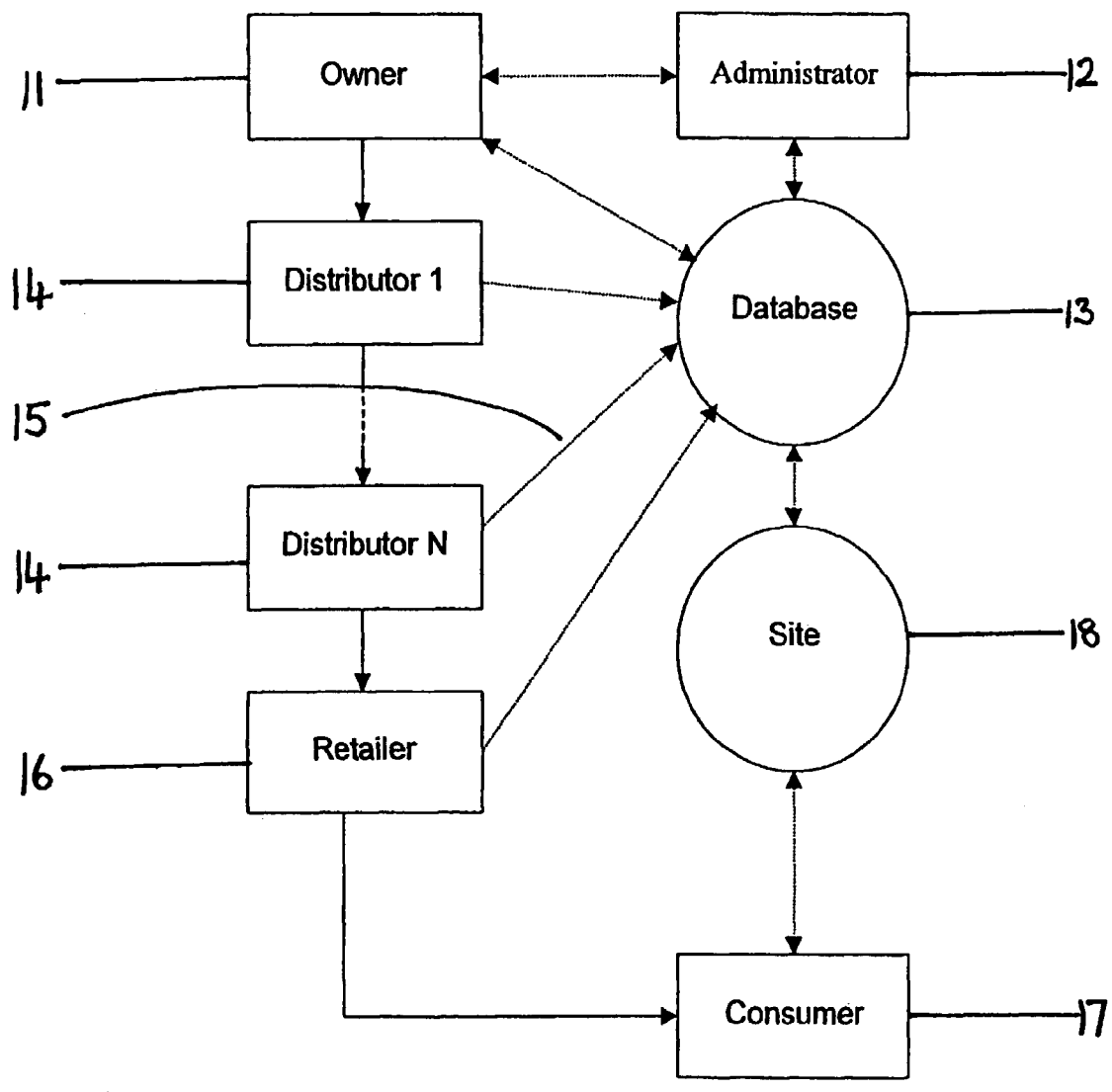
FIG. 6—is block diagram representing a product authentication system according to one embodiment of the current invention.

In FIG. 6 there is illustrated the source of, for example, a branded product and identified as an owner 11, an administrator 12, a database 13, a plurality of inspection points 14 in a distribution chain which stretches from the owner 11 to an end customer 17, an inspection point 16 at the point of sale of the product to the customer 17, communication links 15 connecting each of respective reading devices (not shown) provided at each of the inspection points 14 to the database 13, and an interface 8 to the database 13. The interface 18 is illustrated as a web site which facilitates two way data transactions between the customer 17 and the database 13.

As mentioned, the owner 11 is the brand owner of the product and the controlling authority of the product authentication system. In the illustrated example, the administrator 12 is an entity authorised to operate and maintain the system. The administrator 12 can be the same entity as the owner 11 or alternatively can comprise an entity having an authorised computer programmed to input product data into the database 13 and programmed to control the information transactions between the reading devices at the inspection points 14 and the database 13.

Figure 7:
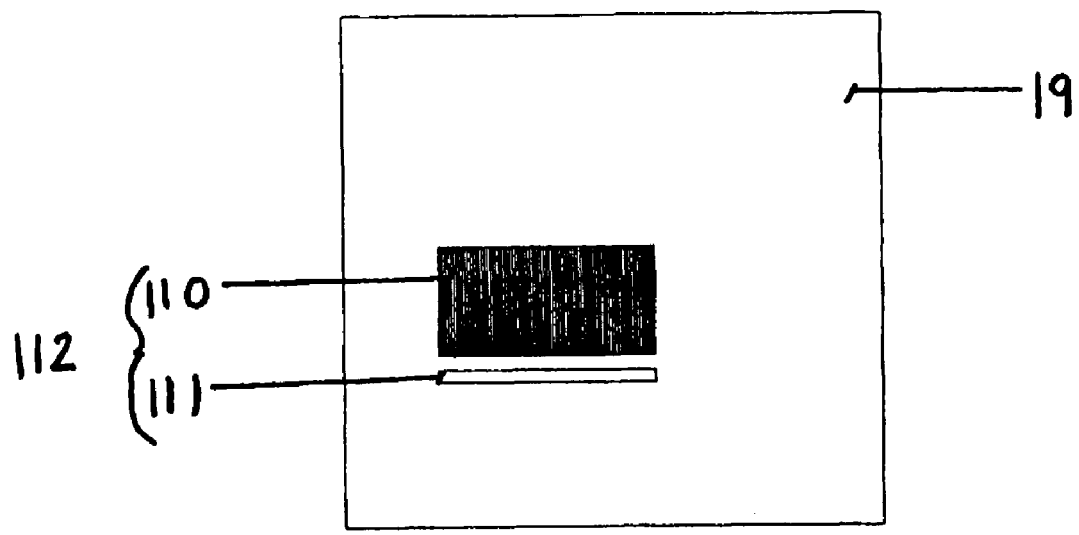
FIG. 7—illustrates product data applied to the product according to one embodiment of the current invention.
Figure 8:
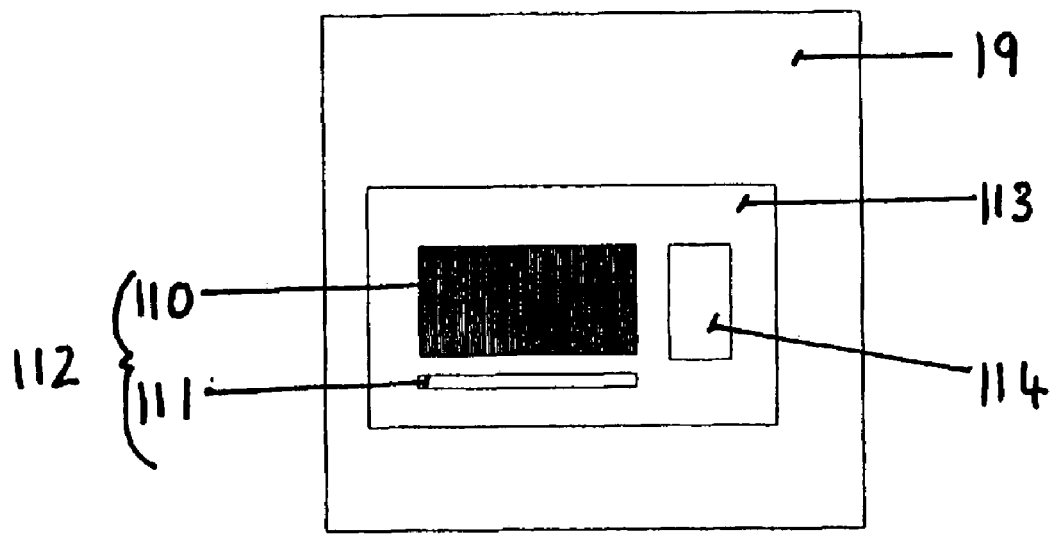
FIG. 8—illustrates product data and a visual security device applied to a product by means of a security label according to one embodiment of the current invention.

The owner 11 and/or the administrator 12 are responsible for encoding products 19 with secure product identification data 112 on either individual product 19 or product packaging as appropriate (see FIGS. 7 and 8). Product data 112 is a combination of encoded product identification data 110 and a product identification number 111 and in one embodiment a secure visual diffractive device to provide visual authentication and to protect against unauthorised copying and duplication of these labels. The product 19 can be any product which can receive or which can be adapted to receive product data 112 on itself or on its packaging, optionally via an applied label. The product authentication system could thus be used in a wide variety of industries. Secure product identification data 112 can be applied to each individual unit and/or the packaging of the product 19 or can be applied to the packaging of batches of product 19. The identification data describes the product and can identify the unit or consignment, the entities or owners that introduced the product into commercial circulation and the place of origin.

The security label carrying the product identification number 111 is displayed on the product 19 with the machine readable identification data and with the visual diffractive security device (to securitise both and allow the label to be visually verified as genuine) which is also displayed on the label applied to the product to allow the customer to visually verify the product. All three elements are preferably carried on the same label to allow verification of genuineness of machine readable data via the visual diffractive optical device and usefully the product number can be partially or wholly applied to the label or diffractive device 19 using indelible methods. In embodiments where indelible methods are not used standard approaches such as inkjet or laser printing can be used to apply the identification number 111 to the product 19. The number can identify the product type or the individual unit as required. The encoded product identification data 110 is typically applied to the product 19 in bar code format, and is machine readable and is securitised against unauthorised copying by the visual diffractive security device. The bar code format can be either linear or bi-dimensional and can also be encrypted using dynamic key encryption algorithms.

The term labelling is used in the broadest sense. That is machine readable product identification data 112, visual diffractive security device and product identification number can preferably can be incorporated in a label 113 which can be adhered to the product 19, the label 113 being retreated with an adhesive during the manufacturing process or an adhesive applied in a separate operation prior to attachment to the product 19. One such example is a security label 113 which is adapted to be destroyed when tampered with. Alternatively labelling the product 19 with product data 112 can be achieved using a variety of printing techniques such as inkjetting, thermal transfer, laser printing or other digital printing methods. Likewise, other techniques such as etching, engraving or embossing can be employed.

Amalgamating the elements of machine readable identification data and visual security device and optionally product identification number into one secure machine readable and visually verifiable preferably tamper evident label and counterfeit protected security label on the product provides a significant security and control enhancement over applying these elements separately, although this possibility is recognised in this invention and is anticipated here as a less secure and less elegant approach.

The owner 11 and/or the administrator 12 can also input the product data 112 into the database 13. The product data 112 is stored in the database 13 and can be accessed and modified by the owner 11 or the administrator 12. Records in the database can also be modified when information is received from the reading devices at the inspection points 14 at various stages in the distribution chain and the inspection point 6 at the point of sale of the product 19 where visual authentication and verification of the correct visual optical diffractive security device also takes place. At the point of sale the customer can also visually verify the optical diffractive security device and later and later access the database using the optional product identification number to further authenticate the genuineness of the product. At this stage the customer can also be provided with additional information or sales opportunities on this or similar products or additional product information. The distribution chain simply refers to the route between the various suppliers who handle the products 19 from the owner 11 through the retailer to the customer 17 at the point of sale 16.

The inspection points 14, 16 are typically remote from the database 13. Data is transferred from the reading devices to the database 13 via communication links 15. The reading devices will typically read the encoded product identification data 110 and a signal is sent to the database 13. This signal contains data about the specific product checked at a particular point in the distribution chain. The encoded product identification data 110 is then compared with the product data stored in the database 13. The comparison can either be performed manually by the owner 11 or administrator 12 or automatically by the database system 13. If a positive comparison is made between the incoming encoded product data 110 and the product data stored in the database 13 then the product identification data record in the database 13 can be updated. For example, the record can be updated to include information about the supplier at the inspection point 14, information pertaining to the previous supplier from whom the products 19 were received, the next destination of the products 19, or details about the retailer or customer at the point of sale 16. Security protocols can be introduced to enable distributor access to the database 13. The purpose to the security protocols is to ensure the data received is from the appropriate distributor and in the correct format to protect the integrity of the product data held in the database 13.

The communication links 15 between the reading devices at the inspection points 14, 16 and the database 13 can be existing telecommunication systems, and can include programmed computers to send product data in a particular format. Alternatively dedicated communication systems can be employed.

The reading devices are adapted to read the encoded product identification data 110. The type of reading devices used depends upon the format of the encoded product identification data 110. A typical reading device is a bar code reader. In some embodiments the bar code reader is adapted to read encrypted bar codes.

Visual optical diffractive security devices 114 can also be attached to the product 19. The purpose of the visual security devices 114 is to provide a visual authentication means in addition to the encoded product identification data 110 and product identification number 111, to authenticate product and authenticate genuineness of label and protect against unauthorised copying of machine readable product data. The visual security devices can be authenticated at any of the inspection points 14, 16. Typical visual security devices 114 include diffraction grating security elements, holographic gratings, security holograms, thin film interference optical devices. These could be augmented by security print techniques, water-marked paper, threaded paper, window threaded paper and security paper, primarily these are anticipated as secondary security devices as they are regarded as having less effectiveness as public recognition devices than diffractive devices, though this invention recognises that such devices could be substituted for the diffractive devices in this system and anticipates and claims such systems also. The visual diffractive security devices 14 can be applied to each individual unit and/or the packaging of product 9 else can be applied to the packaging of batches of product 19. The devices 114 can be applied to, or incorporated with, the label 113. Alternatively the devices 114 can be applied to the product 19 using a variety of printing techniques such as inkjetting, thermal transfer, laser printing or other digital printing methods. Likewise, other techniques such as etching, engraving or embossing can be employed. Certain visual security devices 114 can also be adapted to incorporate machine readable product data.

The interface 18 provides access for the customer 17 to product data stored in the database 13. Using the product identification number 111 the customer is able to select and view the appropriate product distribution route data record and therefore confirm the authenticity of the purchased product 19 in a preferred embodiment in addition to being able to use the visual diffractive security device at the point of sale. The interface 18 can be a web site limited two-way connection. Other data can be made available to the customer 17 such as instruction manuals, warranty details, advertising and promotion and retrieval of additional customer information or offering extra services. A facility to gather customer 17 feedback can also be incorporated into the interface 18. The interface 18 can also be used as for secondary sales of banner space.

The interface 18 can include appropriate security protocols to limit the scope of the customer 17 interaction with the database 13. The customer 17 can be limited to access all or part of the appropriate product distribution route data concerning a specific unit of the product 19 which has been purchased. Further security protocols can be used to ensure that access to the product distribution route data stored in the database 13 is restricted to the customer 17 or to a person nominated by the customer 17. Such protocols may include user names and/or passwords. The customer's 17 user name and password can be supplied with the product. One such method is to automatically generate the user name and/or password on the retailer's receipt at the point of sale 16. Alternatively the user name and/or password can be supplied with the product at the point of commercial circulation or at some later point in the product distribution chain. One such method is to generate the user name and/or password during the product data labelling phase. Where security protocols include encryption algorithms encryption software can also be supplied to the customer 17. Another useful method is to use the product identification number or code incorporated in the original security label for this.

Advantageously the product authentication system can be integrated into the owner's 11 warehousing system. Such a hybrid system can be adapted to facilitate search and movement control functions for the product 19 at the owner's 11 warehouse. The hybrid system can be arranged such that there is communication between the warehouse database and the database 13. Transceiver devices can also be incorporated into the system to facilitate communication between components of the hybrid system.

Usage of the product authentication system will now be described. Product identification data 112 and preferably (optionally) a visual diffractive security device are applied to every unit of the product 19 via typically a security label 113. The product data 112 are sourced by the administrator 12 from the owner and are down loaded into the central database 13. A portion of the source data are converted by the administrator 12 into bar code format (encoded product data 110) using encryption algorithms which are then applied to security labels 113 together with a product identification number 111. The product identification data 110 can be printed on to the security label 113 by either inkjet or laser printing methods. A visual security device 114, such as a holographic grating, is also incorporated into the security label 113, which is then attached to each individual unit of the product 19.

The product is then released into commercial circulation by the owner 11. Encoded product identification data 110 is read by a reading device at the point of original sale and is communicated to the database 13. The product identification data 110 received from the reading device is compared with the product data stored in the database 13. In one embodiment during the product circulation the authenticity of the product and the security label can also be ascertained to a first level visually by use of the visual security device. This comparison can be made automatically by the database system 13 or manually by the administrator 12. If the comparison is positive the database 13 requests data from the point of original sale to update the product data record in the database 13. Additional information about the product route is entered into the database 13 such as the identification of the customer at the point of original sale.

The product 19 then moves through the various stages of the distribution chain until it arrives at the end point of sale 16. Product 19 is inspected and authenticated visually and by machine en route at a number of predetermined inspection points 14 within the distribution chain. Encoded product identification data 110 is read by a reading device at inspection point 14 and is communicated to the database 13. The product data 110 received from the reading device is compared with the product data stored in the database 13. This comparison can be made automatically by the database system 13 or manually by the administrator 12. This process can be performed on-line or in a batch format at the end of a working period. If the comparison is positive the database 13 requests data from the inspection point to update the product data record in the database 13. Additional information about the product route is entered into the database 13. Each inspection point 14 has the appropriate information or hardware to comply with the security protocols built into the database 13 and can carry out visual inspection as appropriate to verify genuineness of security label using the diffractive device in one embodiment which can also be used for first line authentication in situations where machine reading is not available. Each product 19 can also be authenticated by means of visual inspection of the visual security device 114.

Optionally the product passes through one or more inspection points where inspection and authentication of the product is carried out either at the point of sale or elsewhere in the product commercial circulation cycle by a party authorized by the Owner (potentially the Administrator or a party acting for the Administrator, the retailer or suitable points in the distribution chain) which inspection consists of visual and/or instrumental authentication.

The authentication process is repeated at the point of sale 16 to the customer 17 by the retailer. Both the retailer and the customer 17 are also able to visually authenticate the product 19 by the visual security device 115.

Having purchased the product 19 the customer 17 is able to interrogate the database 13 via an interface 18 to authenticate the product 19 by accessing product distribution route information confirming the source of the product and the distribution chain employed so as to receive data verifying the complete route taken from source to end point of sale. The interface 18 is typically a secure web site. The customer 17 is provided with a password and/or user name as appropriate, or in one embodiment uses the product data number or code as applied initially to the security label, or uses any other requirements to comply with the security protocols, so as to be able to access the product data record in the database 13 through the web site. The appropriate product data record is identified using the product identification number 111. The customer 17 can then authenticate the product 19 which has been purchased. The interaction of the customer 17 and the database 13 is restricted.

The interface 18 can also be used by the customer 17 to register for warranties, gain access to general product information or to provide feedback for marketing purposes or additional and specific product information (e.g. usage for pharmaceuticals or safety critical spare parts). The process can be used to inform the customer if the product is not genuine or suspect.

A preferred example of the full system operation is as follow:

Product identification data are applied onto every unit of the Product via Secure data carrier (security label) by the Owner of the product or by the Administrator of the product authentication system appointed by the owner and downloaded into the Database.

The Product is released into commercial circulation by the Owner. Product identification data are retrieved from secure data carrier at the Point of Original Sale, a connection with the Database is established, the Database verifies product identification data and requests updating (additional Product Route data) from the Owner.

The Product arrives to the Distributor and is further released down the Distributor/Retailer chain by the Distributor. Product identification data are retrieved from secure data carrier at the Point of Distributor Sale, a connection with the Database is established whereby access is granted to the Distributor upon verification of the Distributor Password, the Database verifies identification Data and requests updating (additional Product Route data) from the Distributor. This can be done on-line or in a batch format for example at the end of a working period.

Optionally the product passes through one or more Inspection Points where inspection of the product is carried out either at the point of sale or elsewhere in the product commercial circulation cycle by a party authorized by the Owner (potentially the Administrator or a party acting for the Administrator, the retailer or suitable points in the distribution chain) which inspection consists of visual and/or instrumental authentication.

The Product arrives to the Retailer and is further sold to the Consumer. Product identification data are retrieved from secure data carrier at the Point of Retailer Sale, a connection with the Database is established whereby access is granted to the Retailer upon verification of the Retailer Password, the Database verifies product identity data and requests updating (additional Product Route data) from the Retailer. This can be done real time on-line or in batch format for example at end of working day when a number of transactions could be logged.

Optionally in a preferred form both the Retailer and the Consumer at the point of sale can visually verify the authenticity of the Product by the presence and visual performance of the diffractive optical device (OVD).

The Consumer upon purchasing the Product verifies the authenticity by, logging onto the Internet Site applicable to the Owner (additional access restriction for the Consumer can be introduced in the form of the Consumer Password) and inputs the product identification code or number. Having exchanged data with the Database, the Site makes available all or part of the Product Route data for the Consumer to verify purchase detail authenticity and thereby providing the Consumer with 100% accurate authentication of the Product. If the product was not genuine or had not followed the appropriate supply chain the as appropriate Consumer and Owner could be automatically alerted.

Optionally at the consumer verification stage of the Owner can also offer the consumer additional service or functions such as warranty and the owner can request additional information from the Consumer for marketing purposes.

The Internet Site in step is optionally reconciled with additional information in the Database thereby detailing any deviations or unauthorized products which are notified to the Owner and/or appropriate authorities for action.

It should of course be appreciated that the invention is not restricted to the details of the foregoing embodiments.

It should of course be appreciated that the invention is not restricted to the details of the foregoing embodiments as it will be obvious to those skilled in the art that minor changes can be made to the invention, for example, the use of more than one database or inspector, using different techniques to apply product data to the product 9 and the type and number of visual security devices used.

The invention claimed is:

1. A product authentication system for use with products including machine readable product data, the system comprising:
    a product data storage system;
    a plurality of reading devices for reading said machine readable product data;
    communication link means between said reading devices and said product data storage means;
    wherein the reading devices located remotely from the product data storage system are adapted to read the machine readable product data on a unit of product and communicate said product data to said product data storage system via the communication link means to achieve comparison of the product data on the product with product data in the product data storage system and to enable modification of the data in the product data storage system for any unit of product; and
    means for accessing the modified data so as to identify the passage of a unit of product via a succession of reading devices,
    wherein at least one of the portable reading devices is arranged for accessing the machine readable product data remotely from the product data storage system at a point along a product circulation route for the purposes of verification of authenticity of such machine readable product data and hence verification of authenticity of the product, wherein the product comprises an optically-variable diffractive security element open to public verification without a specialized reader.

2. A product authentication system as claimed in claim 1, wherein at least one of the portable reading devices is arranged for accessing the machine readable product data remotely from the product data storage system at a point along a product circulation route for the purposes of verification of authenticity of such machine readable product data and hence verification of authenticity of the product itself.

3. A product authentication system as claimed in claim 1, wherein the at least one of the portable reading devices is arranged for accessing at least part of the product data-for a verification process, and arranged to download the results of the verification process.

4. A product authentication system as claimed in claim 1, wherein the point along the product circulation route is selected in a random manner.

5. A product authentication system as claimed in claim 1, wherein at least part of the product data is downloaded from a database to the at least one of the portable reading devices for the verification process.

6. A product authentication system as claimed in claim 1, and arranged for verification of products at a point of delivery to an end consumer.

7. A product authentication system as claimed in claim 1, further comprising label means upon which the machine readable product data is provided.

8. A product authentication system as claimed in claim 7 wherein the label means comprises a security label which is arranged to be destroyed when tampered with or when the product is unwrapped.

9. A product authentication system as claimed in claim 7, wherein the label means is applied to each product unit and/or the packaging of each product unit.

10. A product authentication system as claimed in claim 7, wherein the label means is applied to the packaging of batches of product units.

11. A product authentication system 1,
wherein the machine readable product data is applied using a method selected from the group consisting of thermal transfer, inikjetting, digital printing processes, mechanical engraving, laser engraving and traditional printing techniques.

12. A product authentication system as claimed in claim 1, wherein the optically-variable-device security element comprises hidden security features.

13. A product authentication system as claimed in claim 12 wherein the hidden security features comprise at least one of fluorescent images, diffractive images, microtexts and microimages.

14. A product authentication system as claimed in claim 1, wherein the optically-variable-device security element is incorporated into a label means containing machine readable product data.

15. A product authentication system as claimed in claim 1, wherein the optically-variable-device security element is formed by applying a surface relief structure by embossing or engraving.

16. A product authentication system as claimed in claim 1, wherein the optically-variable-device security element is machine readable.

17. A product authentication system 1, wherein the machine readable product data is in the format of a bar-code.

18. A product authentication system as claimed in claim 17 wherein the machine readable product data is in the format of a two-dimensional bar-code.

19. A product authentication system 1, wherein the machine readable product data is encrypted.

20. A product authentication system as claimed in claim 19 wherein the machine readable product data is encrypted using asymmetric or dynamic key encryption algorithms.

21. A product authentication system as claimed in claim 1, further comprising a product identification reference.

22. A product authentication system as claimed in claim 21 wherein the product identification reference is arranged to identify corresponding product data stored in the product data storage system.

23. A product authentication system as claimed in claim 1, wherein the at least one of the portable reading devices comprises an intelligent portable reading device, such intelligent portable device being pre-programmed to be able to verify the authenticity of the machine readable product data without communicating to the product data storage system.

24. A product authentication system as claimed in claim 23, wherein the intelligent portable reading device is enabled for reading data responsive to an input of reference data.

25. A product authentication system as claimed in claim 23, wherein a correct data reading at the intelligent portable reading device is dependent upon a conversion algorithm employed for printing the machine readable data.

26. A product authentication system as claimed in claim 1, wherein the at least one of the portable reading devices is used to verify the authenticity of the machine readable product data by communicating with the product data storage system and comparing the retrieved machine readable product data and the product data stored in the product data storage system.

27. A product authentication system as claimed in claim 26, wherein comparing the machine readable product data and the product data stored in the product data storage system is performed automatically.

28. A product authentication system as claimed in claim 1, wherein the machine readable data is compared with the product itself.

29. A product authentication system as claimed in claim 1, wherein access to product data stored in the product data storage system is secure.

30. A product authentication system as claimed in claim 1, wherein the authentication system is arranged to be integrated into a warehousing system.

31. A product authentication system as claimed in claim 1, wherein the machine readable product data comprises a machine readable data representation comprising a graphical indicia adapted to include a digital watermark.

32. A product authentication system as claimed in claim 31, wherein the digital watermark is formed by digitally watermarking line or area printed structures formed by standard print techniques.

33. A product authentication system as claimed in claim 32, wherein the machine readable data representation comprises a 2D bar code adapted to contain second order information by way of the digital watermark.

34. A product authentication system as claimed in claim 32, wherein the digital watermark is formed at pixels defining the edge of the indicia.

35. A product authentication system as claimed in claim 34, wherein the digital watermark consists of a repetitive pattern of edge pixels formed according to a predetermined rule.

36. A product authentication system according to claim 1, wherein the optically-variable-device security element is also provided on the label.

37. A product authentication system according to claim 1, wherein the machine readable product data is in the format of a bar-code.

38. A product authentication system according to claim 37, wherein the machine readable product data is in the format of a bi-dimensional bar-code.

39. A product authentication system for use with products including machine readable product data, the system comprising:
- a product data storage system;
- a plurality of reading devices for reading said machine readable product data;
- communication link means between said reading devices and said product data storage means;
- wherein the reading devices located remotely from the product data storage system are adapted to read the machine readable product data on a unit of product and communicate said product data to said product data storage system via the communication link means to achieve comparison of the product data on the product with product data in the product data storage system and to enable modification of the data in the product data storage system for any unit of product; and
- means for accessing the modified data so as to identify the passage of a unit of product via a succession of reading devices,
- wherein the machine readable product data comprises a forensic machine readable data representation comprising an array of point diffractive structures of individual scale size below the normal resolution of the eye and arranged to comprise a representation of a bar code, and
- wherein the product comprises an optically-variable diffractive security element open to public verification without a specialized reader.

40. A product authentication system as claimed in claim 39, wherein the machine readable data representation further comprises a diffractive representation of a bar code.

41. A product authentication system as claimed in claim 39, wherein the bar code comprises a 2D bar code formed from a portion of a diffractive or holographic image to be replayed in addition to the machine readable data.

42. A product authentication system as claimed in claim 39, wherein the machine readable data representation is arranged such that an optical microscope is arranged to record an enlarged image of the machine readable features for subsequent reading.

43. A product authentication system for use with products including machine readable product data, the system comprising:
- a product data storage system;
- a plurality of reading devices for reading said machine readable product data;
- communication link means between said reading devices and said product data storage means;
- wherein the reading devices located remotely from the product data storage system are adapted to read the machine readable product data on a unit of product and communicate said product data to said product data storage system via the communication link means to achieve comparison of the product data on the product with product data in the product data storage system and to enable modification of the data in the product data storage system for any unit of product; and
- means for accessing the modified data so as to identify the passage of a unit of product via a succession of reading devices,
- wherein the machine readable product data comprises a forensic machine readable data representation comprising an array of matt scattering area structures of individual scale size below the normal resolution of the eye and arranged to comprise a representation of a bar code, and
- wherein the product comprises an optically-variable diffractive security element open to public verification without a specialized reader.

44. A product authentication system for use with products including machine readable product data, the system comprising:
- a product data storage system;
- a plurality of reading devices for reading said machine readable product data;
- communication link means between said reading devices and said product data storage means;
- wherein the reading devices located remotely from the product data storage system are adapted to read the machine readable product data on a unit of product and communicate said product data to said product data storage system via the communication link means to achieve comparison of the product data on the product with product data in the product data storage system and to enable modification of the data in the product data storage system for any unit of product; and
- means for accessing the modified data so as to identify the passage of a unit of product via a succession of reading devices,
- wherein the reading devices are associated with a respective plurality of locations along a product distribution route,
- wherein the modification of data serves to update the data in the product data storage system so as to identify the locations through which the product passes,
- wherein the means for accessing the modified data is arranged to allow an end customer to verify the distribution route taken by the product, said means therefore being available for access by an end customer, and
- wherein the product comprises an optically-variable diffractive security element open to public verification without a specialized reader.

45. A product authentication system for use with products including machine readable product data, the system comprising:
- a product data storage system;
- a plurality of reading devices for reading said machine readable product data;
- communication link means between said reading devices and said product data storage means;
- wherein the reading devices located remotely from the product data storage system are adapted to read the machine readable product data on a unit of product and communicate said product data to said product data storage system via the communication link means to achieve comparison of the product data on the product with product data in the product data storage system and to enable modification of the data in the product data storage system for any unit of product; and
- means for accessing the modified data so as to identify the passage of a unit of product via a succession of reading devices, and including a product identification number arranged to be employed for accessing the modified data,
- wherein an indication of the product identification number is arranged to be generated at the point of sale, and
- wherein the product comprises an optically-variable diffractive security element open to public verification without a specialized reader.

46. A product authentication system according to claim 45, wherein the product identification number is provided with the product.

47. A product authentication system according to claim 46, wherein at least part of the product identification number is applied to the product indelibly.

48. A product authentication system according to claim 45, wherein the means for accessing the modified date includes an interface to the product data storage system.

49. A product authentication system according to claim 48, wherein the product identification number serves to provide access to the interface to the product data storage system for the end customer.

50. A product authentication system according to claim 48, wherein the interface to the product data storage system includes security means which comprises encryption algorithms.

51. A product authentication system for use with products including machine readable product data, the system comprising:
   a product data storage system;
   a plurality of reading devices for reading said machine readable product data;
   communication link means between said reading devices and said product data storage means;
   wherein the reading devices located remotely from the product data storage system are adapted to read the machine readable product data on a unit of product and communicate said product data to said product data storage system via the communication link means to achieve comparison of the product data on the product with product data in the product data storage system and to enable modification of the data in the product data storage system for any unit of product; and
   means for accessing the modified data so as to identify the passage of a unit of product via a succession of reading devices, wherein the machine readable product data is encrypted using a dynamic key encryption algorithm,
   wherein the product comprises an optically-variable diffractive security element open to public verification without a specialized reader.

52. A product authentication system for use with products including machine readable product data, the system comprising:
   a product data storage system;
   a plurality of reading devices for reading said machine readable product data;
   communication link means between said reading devices and said product data storage means;
   wherein the reading devices located remotely from the product data storage system are adapted to read the machine readable product data on a unit of product and communicate said product data to said product data storage system via the communication link means to achieve comparison of the product data on the product with product data in the product data storage system and to enable modification of the data in the product data storage system for any unit of product; and
   means for accessing the modified data so as to identify the passage of a unit of product via a succession of reading devices,
   wherein the means for accessing the modified data is arranged to operate via an Internet connection, and
   wherein the product comprises an optically-variable-device security element open to public verification without a specialized reader.

53. A product authentication system according to claim 52, wherein the Internet connection provides connection to a web site belonging to the source of the product.

54. A method of product authentication for products with machine readable product data comprising the steps of:
   inputting the product data into a product data storage system;
   reading the product data of the product with a reading device present in at least one inspection point within the product distribution chain;
   communicating the product data read by the reading device to the product data storage system via a communication link;
   comparing the received product data from the reading device with the product data stored in the product data storage system for authentication purposes and modifying the product data in the product data storage system; and
   allowing for access to the modified data so as to confirm the manner in which the data was modified at the at least one inspection point and so as to identify the passage of a product via the at least one inspection point, including the step of providing an optically-variable diffractive security element open to public verification without a specialized reader in addition to the machine-readable product data.

55. A method according to claim 54, including the step of authenticating the product at the at least one inspection point by the visual security devices.

* * * * *